(12) United States Patent
Schmidtberg

(10) Patent No.: US 7,487,037 B2
(45) Date of Patent: Feb. 3, 2009

(54) PEDIGREE AND INTEGRITY EVALUATION OF PACKAGES

(75) Inventor: Rupert A. Schmidtberg, Westford, MA (US)

(73) Assignee: Sensitech Inc., Beverly, MA (US)

( * ) Notice: Subject to any disclaimer, the term of this patent is extended or adjusted under 35 U.S.C. 154(b) by 635 days.

(21) Appl. No.: 11/112,755

(22) Filed: Apr. 22, 2005

(65) Prior Publication Data

US 2005/0251431 A1    Nov. 10, 2005

Related U.S. Application Data

(60) Provisional application No. 60/564,447, filed on Apr. 22, 2004, provisional application No. 60/564,402, filed on Apr. 22, 2004.

(51) Int. Cl.
*G01C 21/00*    (2006.01)

(52) U.S. Cl. .................. 701/201; 701/206; 701/207; 340/539.13; 340/572.1; 342/357.08

(58) Field of Classification Search ............ 701/35, 701/36, 200, 201, 206, 207; 342/357.01, 342/357.08, 357.09, 357.1; 340/539.13, 340/572.1, 673; 700/215, 221, 229; 455/456.1, 455/456.5, 456.6, 457
See application file for complete search history.

(56) References Cited

U.S. PATENT DOCUMENTS

| | | | |
|---|---|---|---|
| 5,627,517 A | * | 5/1997 | Theimer et al. .......... 340/572.1 |
| 5,686,888 A | | 11/1997 | Welles, II et al. |
| 5,960,408 A | | 9/1999 | Martin et al. |
| 6,208,253 B1 | | 3/2001 | Fletcher et al. |
| 6,246,882 B1 | | 6/2001 | Lachance |
| 6,335,685 B1 | | 1/2002 | Schrott et al. |
| 6,539,360 B1 | | 3/2003 | Kadaba |
| 6,600,418 B2 | | 7/2003 | Francis et al. |
| 6,750,765 B1 | | 6/2004 | Van Wijk |
| 6,901,304 B2 | | 5/2005 | Swan et al. |
| 6,972,682 B2 | | 12/2005 | Lareau et al. |
| 7,130,771 B2 | | 10/2006 | Aghassipour |
| 7,142,110 B2 | | 11/2006 | Schmidtberg |
| 7,253,731 B2 | | 8/2007 | Joao |
| 2002/0082787 A1 | | 6/2002 | Woodsworth et al. |
| 2004/0027243 A1 | | 2/2004 | Carrender |
| 2004/0036595 A1 | | 2/2004 | Kenny et al. |
| 2004/0069850 A1 | | 4/2004 | De Wilde |

* cited by examiner

*Primary Examiner*—Gertrude Arthur Jeanglaud
(74) *Attorney, Agent, or Firm*—Kinney & Lange, P.A.

(57) ABSTRACT

The present invention is directed to novel systems and methods for authenticating the pedigree and/or confirming the integrity of a transported package. Among other things, a method is disclosed that involves receiving information from an electronic device associated with the package at an authentication appliance at a destination location, transmitting at least a first portion of the information from the authentication appliance to a server, receiving from the server a network address of an authentication computer to be used to evaluate the pedigree and/or integrity of the package, after receiving the network address from the server, transmitting at least a second portion of the information from the authentication appliance to the authentication computer at the network address, and receiving from the authentication computer a signal indicative of a determination made by the authentication computer concerning the pedigree and/or integrity of the package based upon a comparison of the at least the second portion of the information with data stored in a database.

38 Claims, 3 Drawing Sheets

PEDIGREE AND INTEGRITY EVALUATION OF PACKAGES

CROSS-REFERENCE TO RELATED APPLICATIONS

This application claims the benefit, under 35 U.S.C. §119 (e), of the filing date of each of U.S. provisional application Ser. No. 60/564,447 entitled "Recording of Location Event Information in RFID Tags," filed Apr. 22, 2004, and U.S. provisional application Ser. No. 60/564,402 entitled "Pedigree and Integrity Evaluation of Packages," filed Apr. 22, 2004. Each of the foregoing applications is hereby incorporated herein by reference in its entirety.

FIELD OF INVENTION

The present invention relates generally to methods and apparatuses that may be used to authenticate the pedigree and/or integrity of a transported package. In some embodiments, information accumulated at a source location for a package, e.g., by entering the information into a database, is compared with information accumulated at a destination location for the package, e.g., by reading the information from a radio frequency identification (RFID) tag associated with the package, so that the pedigree and/or integrity of the package can be authenticated.

BACKGROUND

An important business process is the transportation of goods through a manufacturing process or supply chain/distribution network. During transportation through such channels, which may include several links and involve significant time periods (transport via land, sea and/or air, storage in one or more warehouses, etc.), products are susceptible to many potential harms. For example, goods may be misdirected, damaged, tampered with, and/or exposed to adverse environmental conditions. For certain goods, it is often useful, and in some cases critical, to know whether goods received at a destination location have been subjected to any such harms.

Conventional methods of determining whether goods have been exposed to these harms have relied on human intervention and other potentially time consuming and/or unreliable mechanisms. A need exists for improved methods and apparatuses for evaluating the pedigree and/or integrity of goods received at a destination.

SUMMARY

The present invention is directed to novel systems and methods for authenticating the pedigree and/or confirming the integrity of a transported package.

According to one aspect of the present invention, a method of evaluating the pedigree of a package transported from a source location to a destination location, the method comprises steps of (a) receiving first information concerning the package at at least one processor, the first information identifying location event information that was expected to have been accumulated by an electronic device associated with the package while the package was being transported from the source location to the destination location, (b) receiving second information concerning the package at the at least one processor, the second information comprising location event information that was actually accumulated by the electronic device associated with the package while the package was being transported from the source location to the destination location, and (c) with the at least one processor, comparing the second information with the first information to evaluate the pedigree of the package.

According to another aspect, a method of evaluating the integrity of a package transported from a source location to a destination location comprises steps of (a) receiving first information concerning the package at at least one processor, the first information identifying acceptable parameters for a physical or environmental condition of the package while the package was being transported from the source location to the destination location, (b) receiving second information concerning the package at the at least one processor, the second information identifying a physical or environmental condition of the package that was sensed by a sensor included in an electronic device associated with the package and stored in memory of the electronic device while the package was being transported from the source location to the destination location, the second information having been retrieved from the memory of the electronic device at the destination location, and (c) with the at least one processor, comparing the first information with the second information to evaluate the integrity of the package.

According to another aspect, a system for evaluating the integrity of a package transported from a source location to a destination location comprises an authentication computer configured and arranged to receive data accumulated at the destination location from a memory of an electronic device including a sensor that had monitored a physical or environmental condition of the package while the package was being transported from the source location to the destination location, to analyze the data to determine whether it falls within acceptable parameters for the physical or environmental condition of the product while the package was being transported from the source location to the destination location, and to transmit a signal to the destination location reflecting a determination made by the authentication computer concerning the integrity of the package.

According to another aspect, a system for evaluating the pedigree of a package transported from a source location to a destination location comprises an authentication computer configured and arranged to receive location event information accumulated by an electronic device associated with a package while the package was being transported from the source location to the destination location, to analyze the data to determine whether the data sufficiently corresponds with location event information that was expected to have been accumulated by the electronic device while the package was being transported from the source location to the destination location, and to transmit a signal to the destination location reflecting a determination made by the authentication computer concerning the pedigree of the package.

According to another aspect, a method of evaluating the pedigree and/or integrity of a package transported from a source location to a destination location comprises steps of (a) receiving information from an electronic device associated with the package at an authentication appliance at the destination location, (b) transmitting at least a first portion of the information from the authentication appliance to a server, (c) receiving from the server a network address of an authentication computer to be used to evaluate the pedigree and/or integrity of the package, (d) after receiving the network address from the server, transmitting at least a second portion of the information from the authentication appliance to the authentication computer at the network address, and (e) receiving from the authentication computer a signal indicative of a determination made by the authentication computer concerning the pedigree and/or integrity of the package based upon a comparison of the at least the second portion of the information with data stored in a database.

According to another aspect, a method of evaluating the pedigree and/or integrity of a package transported from a source location to a destination location comprises steps of (a) receiving information from an electronic device associated with the package at an authentication appliance at the destination location, (b) transmitting at least a first portion of the information from the authentication appliance to a server, (c) receiving from the server a network address of an authentication computer to be used to evaluate the pedigree and/or integrity of the package, (d) after receiving the network address from the server, transmitting at least a second portion of the information from the authentication appliance to the authentication computer at the network address, and (e) with the authentication computer, comparing the at least the second portion of the information with data stored in a database to make a determination concerning the pedigree and/or integrity of the package.

According to another aspect, a method for evaluating the pedigree and/or the integrity of a package comprises steps of (a) receiving first information concerning the package at at least one processor, the first information reflecting a containment relationship amongst components of the package and having been accumulated at least in part before the package left a source location, (b) receiving second information concerning the package at the at least one processor, the second information reflecting a containment relationship amongst components of the package and having been having been accumulated after the package reached a destination location, and (c) using the at least one processor to compare the second information with the first information to evaluate the pedigree and/or confirm the integrity of the package.

DETAILED DESCRIPTION

Figure 1:
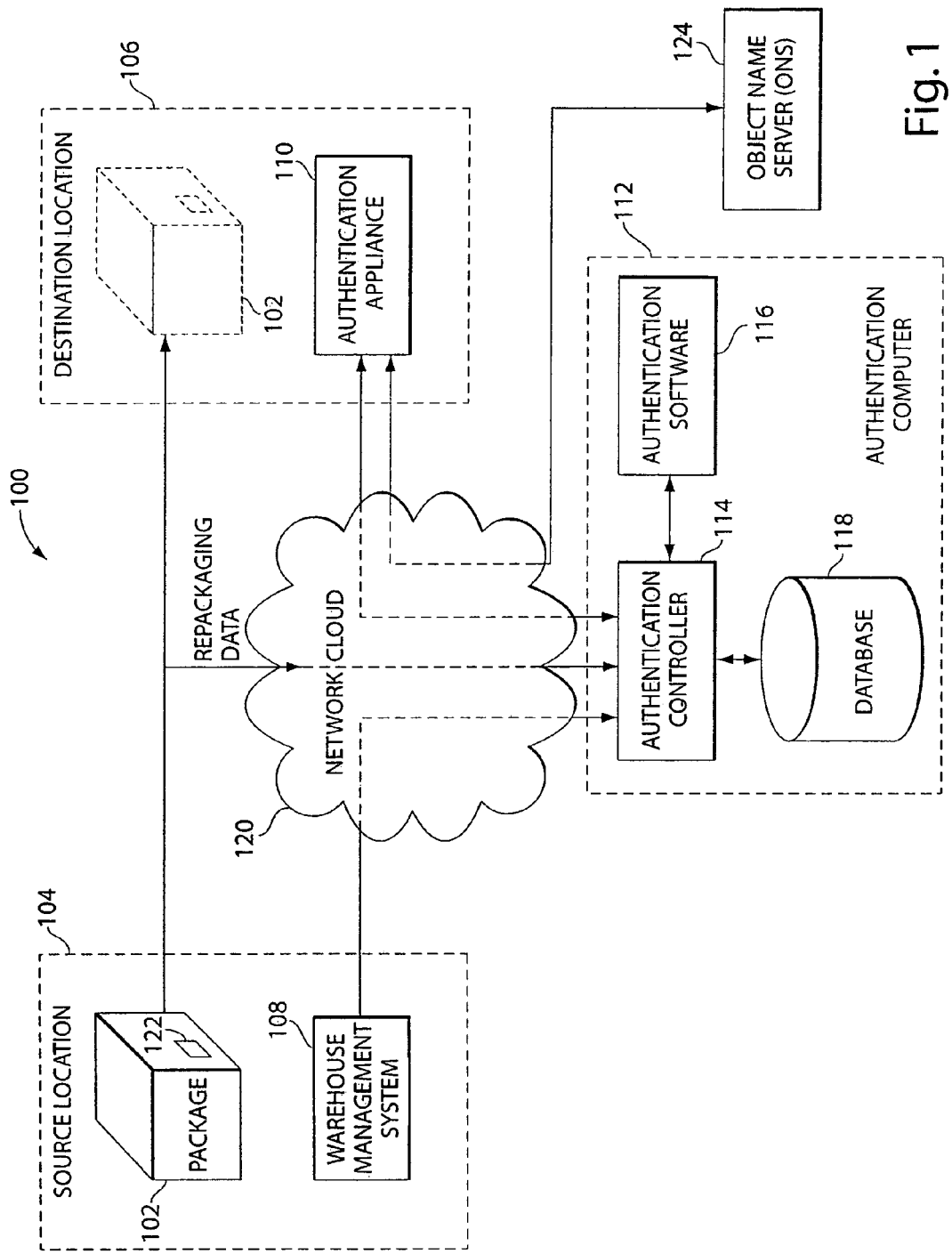
FIG. 1 is a block diagram showing an illustrative embodiment of a system for authenticating the pedigree and/or confirming the integrity of a package.

FIG. 1 is a block diagram showing an illustrative embodiment of a system 100 for authenticating the pedigree of a package 102 (and confirming the integrity of its contents) that has been transported from a source location 104 to a destination location 106. As used herein, the term "package" is intended to refer generically to any item or combination of items that can be transported from one location to another, and may, for instance, refer to a single item (i.e., the lowest level of product packaging such as a single vial, syringe, or bottle); a carton containing one or more items; a box containing one or more cartons; a pallet on which one or more boxes are placed; a trailer or shipping container containing one or more pallets, boxes or cartons; or a truck, airplane, train, ship, etc., carrying one or more trailers or shipping containers.

As shown, the system 100 may include a warehouse management system 108 at the source location 102, an authentication appliance 110 at the destination location 106, and an authentication computer 112 located somewhere in the system 100. The authentication computer 112 may, for example, be located at the source location 102, at the destination location 104, or at some location remote from the source and destination locations. In some embodiments, multiple authentication computers 112 may be used, perhaps at different locations, with each computer performing a different type of evaluation (e.g., one computer may authenticate the pedigree of the package 104 and another may confirm the integrity of its contents). In the example shown, the authentication computer 112 includes an authentication controller 114, a program memory 116, and a database 118. The authentication controller 114 may, for example, execute authentication software stored in the program memory 116, and also access data stored in the database 118.

The warehouse management system 108 and authentication appliance 110 may each communicate with the authentication controller 114 via a network cloud 120. The network cloud 120 may be any known system for enabling communication between electronic devices. It may, for example, comprise the Internet, one or more proprietary wide or local area networks, one or more dedicated communication channels, or some combination of the foregoing.

Before the package 102 leaves the source location 104, the warehouse management system 108 may be provided with various pieces of data concerning the package 102, and that data may be communicated to the authentication computer 112 (via the network cloud 120) and stored in the database 118. Examples of types of data that may be provisioned into the database 118 in this manner are discussed below. In addition, data concerning the repackaging of items contained in the package 102 ("repackaging data") may be communicated to the authentication computer 112 from computers at one or more intermediate locations (not shown) responsible for such repackaging.

As used herein, the term "warehouse management system" is intended to broadly describe any system for storing information concerning products that are to be transported within a manufacturing process or a supply chain and/or distribution network, and is thus intended to encompass systems such as order management systems, enterprise resource planning (ERP) systems, and the like, in addition to systems responsible for managing the contents of warehouses.

Additional data may also be accumulated by one or more electronic devices 122 associated with the package 102 during transport. Such data may be accumulated before, during, and after the transportation of the package from the source location 102 to the destination location 106. The data accumulated by the electronic device(s) 122 may include, for example, data reflecting temperature, humidity, or other physical or environmental conditions to which the package 102 has been subjected. Examples of electronic device(s) 122 that may be used for this purpose are described in commonly-owned U.S. patent application Ser. No. 10/934,052, which is incorporated herein by reference in its entirety.

In some embodiments, the data accumulated by the electronic device(s) 122 may also include "location event information," i.e., data reflecting the various fixed geographic or mobile locations at or in which the package 102 was located during its journey, and perhaps the period of time the package 102 spent at each such location. Examples of electronic device(s) 122 that may be used to accumulate such information are described in the commonly-owned U.S. Patent Application entitled "Recording of Location Event Information in RFID Tags," filed on even date herewith under attorney docket number S1446.70022US01, and incorporated herein by reference in its entirety.

When the package 102 reaches the destination location 106, the authentication appliance 110 may be used to collect data concerning the package 102, and perhaps download data accumulated by the electronic device(s) 122 associated with the package 102. After such data has been accumulated by the authentication appliance 110, the authentication appliance 110 may communicate the accumulated data to the authentication computer 112, and request that the authentication computer 112 authenticate the pedigree and/or confirm the integrity of the contents of the package 102.

In response to this request, the authentication computer 112 may compare the data received from the authentication appliance 110 with the data stored in the database 118 so as to authenticate the pedigree of the package 102. Additionally or alternatively, the authentication computer 112 may confirm that the integrity of the contents of the package 102 has not been compromised, for example, by having been subjected to adverse temperature or humidity conditions for excessive amounts of time, or having spent too much time in the distribution chain (e.g., past an expiration date). This may be accomplished, for example, by comparing data accumulated by and downloaded from the electronic device(s) 122 associated with the package 102 and/or the time the package 102 was received at the destination location 106 with data stored in the database 118 to ensure that such measurements fall within acceptable parameters.

Advantageously, some or all of the data received from the authentication appliance 110, or from elsewhere, may also be stored in the database 118 for further authentication or tracking purposes. For example, it may be useful to access such data in the future to identify the ultimate destinations of the various components of a particular lot of a product known to potentially contain a particular defect. Indeed, one step in the authentication process employed by the authentication computer 112 may be to verify that no other packages 102 from the lot in which that package originated have been recalled for any purpose or discovered to have been compromised in any way.

One simple way that the pedigree of a package 102 can be evaluated is by associating one or more unique identifiers with the package 102 before the package 102 leaves the source location 104, and communicating the identity of those unique identifier(s) from the warehouse management system 108 to the database 118 of the authentication computer 112. When the package 102 reaches the destination location, the authentication computer 112 may then confirm that the received package 102 is authentic by verifying that the unique identifier(s) associated with the package 102 when it is received correspond with the unique identifier(s) stored in the database 118. The authentication computer 112 may also verify that the package 102 has not been placed on a recall list, has not been flagged as having been stolen, misplaced, or mishandled, and/or does not represent a second instance of the same unique identifier(s) passing through the same or a parallel transportation channel.

In some embodiments, one or more radio frequency identification (RFID) tags having embedded electronic product codes (EPCs) may be associated with the package 102, which RFID tags may be read by an RFID reader included in the authentication appliance 110. In such embodiments, the RFID tags may optionally be included within the housing of and/or integrated functionally with other components of the electronic device(s) 122. Alternatively, the unique identifiers for the packages 102 may comprise alphanumeric codes, bar codes, invisible ink markings, etc., which may be either automatically read by or manually input into the authentication appliance 110. When EPC codes or other distinguishing identifiers are used, the internet protocol (IP) address of the authentication computer 112 that is to be used to authenticate the pedigree and/or confirm the integrity of the package 102 may be retrieved from an object name server (ONS) 124, as discussed more detail below.

In some embodiments, authentication computers may be specific to one or more products and/or manufacturers and may thus include data and algorithms that correspond only to such products and/or manufacturers. In such embodiments, it may therefore be necessary for the authentication appliance to initially determine which authentication computer it should use to authenticate the pedigree and/or confirm the integrity of the contents of a particular package 102. One possible method for selecting the proper authentication computer involves using the EPC embedded in an RFID tag, as an EPC is a unique identifier that is both product specific and manufacturer specific.

In some embodiments, the EPC or other identifier may be read by an RFID reader included in the authentication appliance 110, and then transmitted by the authentication appliance 110 to the ONS 124. The ONS 124 may then respond by transmitting to the authentication appliance 110 the IP address (or other network address) of the authentication computer 112 that is to be used to authenticate the pedigree and/or confirm the integrity of the package 102. Thereafter, the authentication appliance 110 may communicate directly with the authentication computer 112 via the network cloud.

In other embodiments, the IP address of an EPC server containing EPC information for the package 102 may be retrieved from the ONS 124. That EPC server may then be contacted to retrieve information concerning the package 102, and such retrieved information may advantageously include the IP address of the authentication computer 112 that is to be used to authenticate the pedigree and/or confirm the integrity of the package 102.

In some embodiments, information indicating that a package 102 having particular unique identifier(s) associated with it is being shipped to the destination location 106, and perhaps indicating that the package 102 is expected to arrive at the location 106 within a particular time window, may also be transmitted from the warehouse management system 108 at the source location 104 to the database 118 of the authentication computer 112. In such cases, when the package 102 reaches the destination location 106, the authentication computer 112 may also verify, based on the information stored in the database 118, that the package 102 having such unique identifier(s) was actually received at its intended destination, and that the package 102 was actually received within the expected time window. Thus, if the package 102 was misdirected or experienced a significant delay during transport, appropriate action may be taken to investigate the cause of the discrepancy.

In embodiments in which location event information is communicated to and written into memory of one or more electronic devices 122 as the package 102 travels between the source location 104 and the destination location 106, that location event information can also be retrieved from the electronic device(s) 122 by the authentication appliance 110 and communicated to the authentication computer 112. If information concerning the intended supply and/or distribution chain for the product 102 had been communicated from the warehouse management system 108 to the database 118, then the authentication computer 112 can confirm that the package 102 traveled through the correct supply and/or distribution chain by comparing the location event information accumulated by the electronic device(s) 122 with the intended supply and/or distribution chain information contained in the database 118. When the accumulated location event information also includes data reflecting mobile locations (e.g., cargo containers, trailers, railroad cars, airplanes, etc.) in which the package was disposed at particular times, it may also be determined whether the packages were transported through the distribution chain on the appropriate vehicles or in appropriate containers.

Another way the pedigree of a product can be authenticated is by evaluating the "containment relationship" amongst components of a package 102 received at the destination location 106. As used herein, a "containment relationship" exists between two packages when one of the packages is contained within the other, or when one package is disposed upon another along with other like packages (e.g., a containment relationship would exist between a pallet and several boxes disposed on it). Such a containment relationship can be evaluated, for example, by associating unique identifiers, e.g., RFID tags containing EPCs, at various containment "levels" of the package 102.

Figure 2:
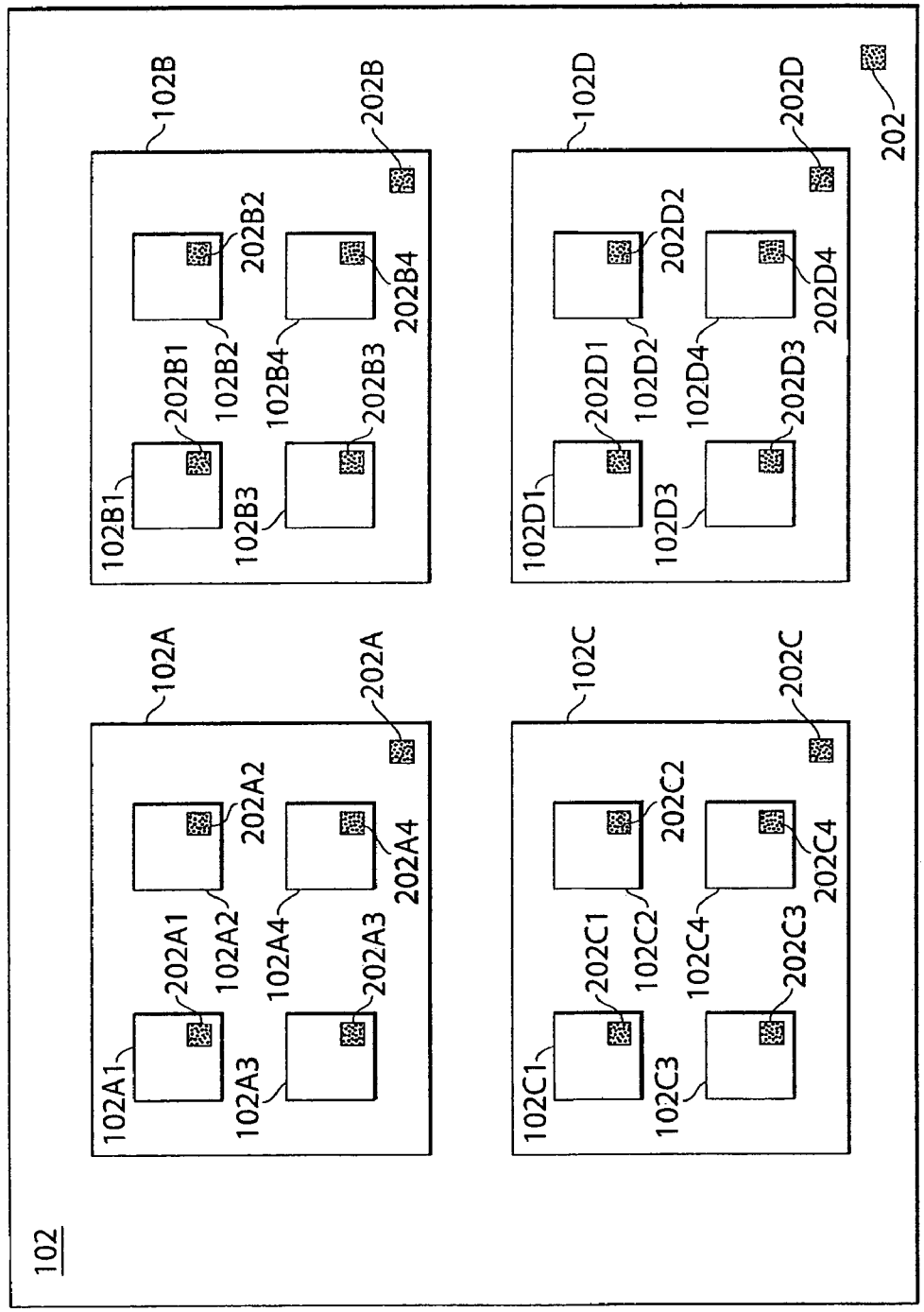
FIG. 2 shows an example of how RFID tags may be associated with various containment levels of a package.

FIG. 2 shows an illustrative example of how this may be accomplished at three levels of packaging. The package 102 shown in FIG. 2 may, for example, represent a pallet which has four boxes 102A-D disposed on it. Each of the four boxes 102A-D, in turn, may contain four cartons 102A1-4, 102B1-4, 102C1-4 and 102D1-4 of some product (e.g., vials of vaccine). As shown, the package (e.g., pallet) 102 may itself have an RFID tag 202 associated with it. In addition, each of the packages (e.g., boxes) 102A-D may have an RFID tag 202A-D associated with it, and each of the packages (e.g., cartons) 102A1-4, 102B1-4, 102C1-4 and 102D1-4 may also have an RFID tag 202A1-4, 202B1-4, 202C1-4 and 202D1-4 associated with it.

Information concerning which RFID tags 202 are associated with which packages and sub-packages 102 may be provided from the warehouse management system 108 to the database 118. As noted above, information concerning how items are repackaged at intermediate locations may also be communicated to the database 118 from the locations at which such repackaging took place. Thus, when the authentication appliance 110 reads the RFID tags 202 from the incoming package(s) 102, and transmits such information to the authentication computer 112, the authentication computer 112 can verify that the actual containment relationship amongst the components of the package 102 corresponds to the containment relationship data stored in the database 118.

Examples of electronic devices 122 comprising RFID tags that may be associated with a package 102 and that may be used to store and accumulate data concerning (1) the unique identity of the package, (2) the physical configuration and intended transportation route and destination of the package, (3) physical and environmental condition(s) of the package as a function of time during its transport, and (4) the physical location (geographic and mobile) of the package as a function of time during its transport, are described in the commonly-owned application entitled "Recording of Location Event Information in RFID Tags," filed on even date herewith and incorporated by reference above.

Figure 3:
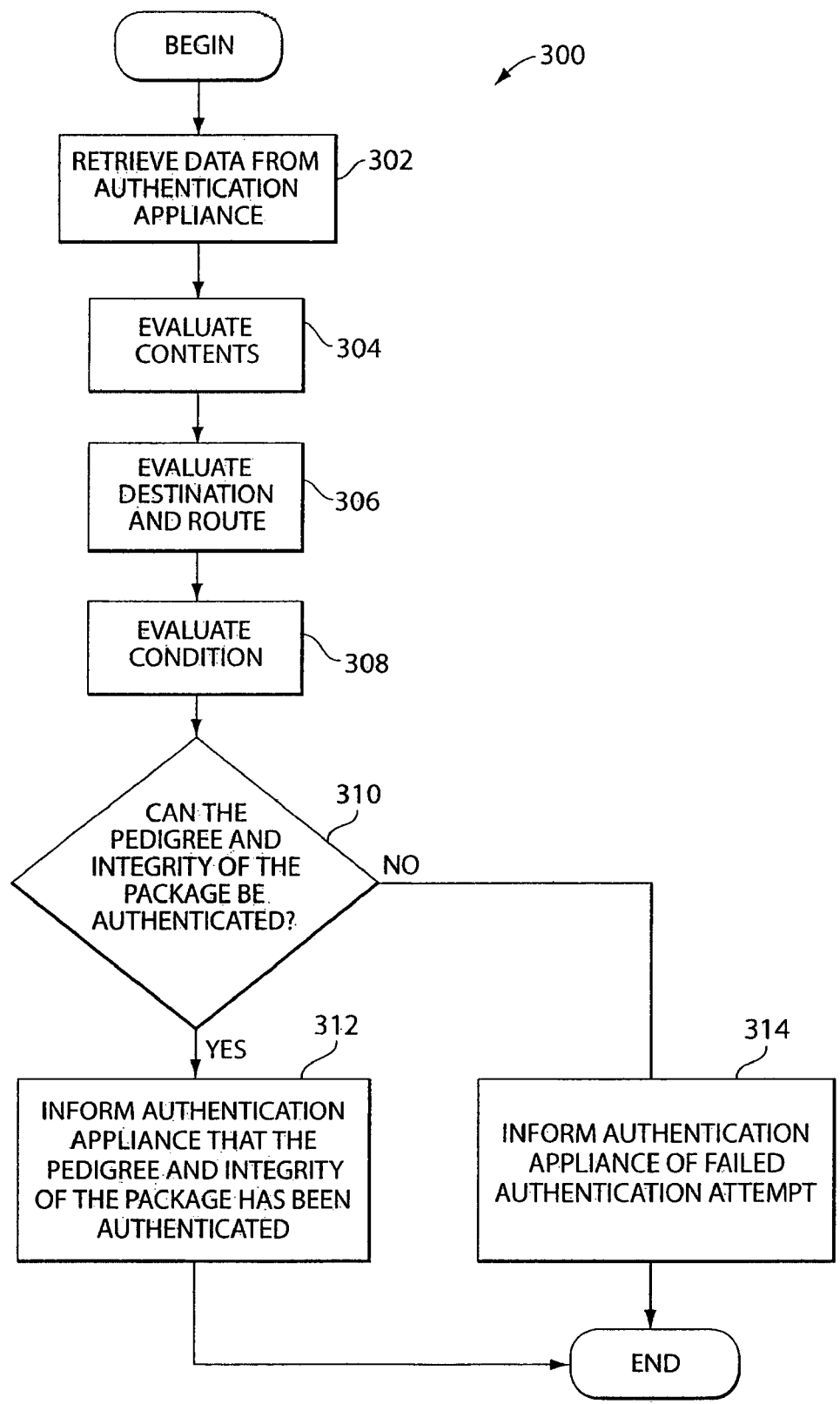
FIG. 3 is a flow chart illustrating a routine that may be performed by an authentication controller to authenticate the pedigree and/or confirm the integrity of the contents of a package.

FIG. 3 is a flow chart of a routine 300 that may be performed by the authentication controller 114 to authenticate the pedigree and/or confirm the integrity of the contents of a package 102 received at the destination location 106. Instructions to be executed by the controller 114 ("authentication software") may be stored, for example, in the program memory 116, or in any other computer-readable medium accessible by the authentication controller 114.

As reflected in step 302, when a request is received from the authentication appliance 110 to authenticate the pedigree and/or confirm the integrity of the contents of a package 102, data to be used for such purposes may be initially retrieved by the authentication controller 114 from the authentication appliance 110. That data may comprise, for example, data that has been accumulated from RFID-enabled electronic devices(s) 122 associated with the package 102, including information such as EPCs, data from sensors used to monitor physical or environmental conditions of the package, tracking data accumulated by electronic device(s) 122, manifest data, etc. Information concerning the authentication appliance 110 itself, such as its identity and location, and the times at which it received data from the electronic device(s) 122 and transmitted the authentication request to the authentication computer 112, may also be communicated from the authentication appliance 110 to the authentication computer 112.

At the step 304, the actual contents of the package 102 are evaluated and compared with information stored in the database 118, so as to make a determination as to whether the package 102 includes the correct contents. As discussed above, one way this can be done is by comparing the unique identifiers (e.g., EPCs) received from the authentication appliance 110 with the unique identifiers supplied by the warehouse management system 108, as modified by repackaging data received from intermediate locations authorized to perform repackaging. In this manner, it can be confirmed that the actual containment relationship between the package 102 and its sub-packages corresponds to the expected containment relationship, as reflected by the data stored in the database 118.

In some embodiments, manifest data may additionally or alternatively be retrieved by the authentication appliance 110 from one or more electronic devices 122 associated with the package 102 (e.g., manifest data stored in the electronic devices 122 associated with various pallets in the package). That manifest data may then be compared with the actual contents of the package 104 (as determined by the authentication appliance 110) to confirm that the actual contents of the package 102 match those listed in the manifest. This comparison may be done either by the authentication appliance 110 itself, or by the authentication computer 112, provided the manifest data retrieved from the electronic devices 122 has been communicated from the authentication appliance 110 to the authentication computer 112. The manifest data retrieved from such electronic devices 122 by the authentication appliance 110 may also be compared with manifest data that was sent to the database 118 by the warehouse management system 108, thereby obtaining an added level of confirmation that the package 102 that was actually received at the destination location 106 corresponds to that which was dispatched from the source location 104.

In addition, when the manifest data retrieved from the electronic device(s) 122 is transmitted from the authentication appliance 110 to the authentication computer 112, it may also be used to "fill in" certain gaps in other information retrieved by the authentication appliance 110. For example, there may be occasions on which a handful of RFID tags are unreadable by the authentication appliance 110 because of the manner in which the package 102 is oriented or arranged. In such circumstances, it may be deemed acceptable to assume that a few of the tags will be missed and to fill in the gaps in accordance with the manifest data read from one or more other tags.

At the step 306, the current location of the package 102, the route by which the package 102 arrived at its current location, and the identity of the vehicles or containers that were used to transport the package, may be evaluated and compared with information stored in the database 118, so as make a determination as to one or more of (a) whether the package 106 has arrived at its expected destination, (b) whether the package arrived at the destination location 106 via the correct route, (c) whether the package 104 was transported in the proper vehicles or containers, and (d) whether the package was transported in accordance with an expected time schedule. As noted above, one way this can be accomplished is by using the authentication computer 112 to compare location event information accumulated by the electronic device(s) 122 (read by the authentication appliance 110 and transmitted to the authentication computer 112) with information stored in the database 118 that reflects the intended destination, route, transportation mode, and schedule for the package 102.

At the step 308, the condition of the product may be evaluated, for example, by determining whether any products have been subjected to excessive temperatures, humidity conditions, etc., for excessive periods of time, determining whether any products have expiration dates that make them un-saleable, determining whether any products have been recalled, determining whether any products are samples that have been misdirected to a distributor and should not be sold, etc.

At the steps 310-314, one or more messages may be communicated to the authentication appliance 110, informing it whether the pedigree of the package 102 could be authenticated and/or the integrity of the contents of the package 102 could be confirmed. In the event pedigree and/or integrity of the package 102 or its contents could not be authenticated or confirmed, information concerning the reason(s) for the failure may be communicated to the authentication appliance 110 and perhaps elsewhere (e.g., the supply chain management system), so that the appropriate investigative or corrective action can be taken. In some embodiments, the authentication appliance 110 may generate an immediate response, e.g., an alarm, at least under certain circumstances to signify that some failure has occurred in the authentication process. Alternatively, messages may be transmitted to a computer at the destination location 106, or elsewhere, indicating the nature of the failure and suggesting that investigative or corrective action be taken before the package 102 responsible for the failure leaves the destination location 106.

It should be appreciated that, in some embodiments, the entire authentication process discussed herein may be fully automated, i.e., could function normally without human interaction. Thus, at any destination location 106 (which may be an intermediate location in a larger supply or distribution chain) equipped with an authentication appliance 110, the pedigree and/or integrity of received packages and their contents could be evaluated automatically as a matter of course. In embodiments in which RFID technology is employed, for example, such authentication could occur automatically whenever a package 102 enters the RF range of an authentication appliance 110. Alternatively, authentication could occur automatically by the authentication computer 112 in response to a user transmitting an authentication request to it after the authentication appliance 110 has been provided with the necessary data, or after the package 102 has been located in a position with respect to the authentication appliance 110 that it can accumulate the required data when such a request is made.

Although the routine 300 discussed in connection with FIG. 3 is described as being performed by an authentication controller 114 that is separate from the warehouse management system 108 and the authentication appliance 110, the invention is not limited in this respect. For example, the routine 300 may additionally or alternatively be performed partially or entirely by one or more processors included in the authentication appliance 110 and/or the warehouse management system 108.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A method of evaluating the pedigree of a package transported from a source location to a destination location, the method comprising steps of:
    (a) receiving first information concerning the package at at least one processor, the first information identifying location event information that was expected to have been accumulated by an electronic device associated with the package while the package was being transported from the source location to the destination location;
    (b) receiving second information concerning the package at the at least one processor, the second information comprising location event information that was actually accumulated by the electronic device associated with the package while the package was being transported from the source location to the destination location; and
    (c) with the at least one processor, comparing the second information with the first information to evaluate the pedigree of the package.

2. The method of claim 1, further comprising steps of:
    (d) accumulating the second information from the electronic device at the destination location; and
    (e) transmitting the second information to the at least one processor via a network connection.

3. The method of claim 2, further comprising a step of:
    (f) with the at least one processor, transmitting at least one signal to the destination location via the network connection reflecting a determination made by the at least one processor concerning the pedigree of the package.

4. The method of claim 3, wherein the steps (a)-(f) are performed automatically.

5. The method of claim 1, wherein the electronic device comprises a radio frequency identification (RFID) tag, and wherein the method further comprises steps of:
    accumulating the second information at the destination location by using an RFID reader to read the second information from the RFID tag; and
    communicating the second information from the RFID reader to the at least one processor.

6. The method of claim 1, further comprising a step of:
    communicating the first information from a warehouse management system at the source location to a database accessible by the at least one processor.

7. The method of claim 1, wherein the at least one processor is remote from the electronic device.

8. A method of evaluating the integrity of a package transported from a source location to a destination location, the method comprising steps of:
    (a) receiving first information concerning the package at at least one processor, the first information identifying acceptable parameters for a physical or environmental condition of the package while the package was being transported from the source location to the destination location;
    (b) receiving second information concerning the package at the at least one processor, the second information identifying a physical or environmental condition of the package that was sensed by a sensor included in an electronic device associated with the package and stored in memory of the electronic device while the package was being transported from the source location to the destination location, the second information having been retrieved from the memory of the electronic device at the destination location; and (c) with the at least one processor, comparing the first information with the second information to evaluate the integrity of the package.

9. The method of claim 8, further comprising steps of:

(d) accumulating the second information from the electronic device at the destination location; and (e) transmitting the second information to the at least one processor via a network connection.

10. The method of claim 9, further comprising a step of:

(f) with the at least one processor, transmitting at least one signal to the destination location via the network connection reflecting a determination made by the at least one processor concerning the integrity of the package.

11. The method of claim 10, wherein the steps (a)-(f) are performed automatically.

12. The method of claim 8, wherein the electronic device comprises a radio frequency identification (RFID) tag, and wherein the method further comprises steps of:

accumulating the second information at the destination location by using an RFID reader to read the second information from the RFID tag; and communicating the second information from the RFID reader to the at least one processor.

13. The method of claim 8, further comprising a step of:

communicating the first information from a warehouse management system at the source location to a database accessible by the at least one processor.

14. The method of claim 8, wherein the second information identifying a physical or environmental condition of the package is temperature information.

15. A system for evaluating the integrity of a package transported from a source location to a destination location, comprising:

an authentication computer configured and arranged to receive data accumulated at the destination location from a memory of an electronic device including a sensor that had monitored a physical or environmental condition of the package while the package was being transported from the source location to the destination location, to analyze the data to determine whether it falls within acceptable parameters for the physical or environmental condition of the package while the package was being transported from the source location to the destination location, and to transmit a signal to the destination location reflecting a determination made by the authentication computer concerning the integrity of the package.

16. The system of claim 15, further comprising an authentication appliance, wherein the authentication appliance comprises means for receiving the data accumulated by the sensor and means for communicating the data to the authentication computer.

17. The system of claim 16, wherein the authentication appliance is configured and arranged to automatically accumulate the data after the package has reached the destination location.

18. The system of claim 15, wherein the electronic device comprises a radio frequency identification (RFID) tag associated with the package, and wherein the system further comprises an RFID reader configured and arranged to read the data from the memory of the RFID tag, and to communicate the data to the authentication computer.

19. The system of claim 15, wherein the physical or environmental condition of the package comprises a temperature condition.

20. A system for evaluating the pedigree of a package transported from a source location to a destination location, comprising:

an authentication computer configured and arranged to receive location event information accumulated by an electronic device associated with a package while the package was being transported from the source location to the destination location, to analyze the data to determine whether the data sufficiently corresponds with location event information that was expected to have been accumulated by the electronic device while the package was being transported from the source location to the destination location, and to transmit a signal to the destination location reflecting a determination made by the authentication computer concerning the pedigree of the package.

21. The system of claim 20, further comprising an authentication appliance, wherein the authentication appliance comprises means for receiving the location event information accumulated by the electronic device and means for communicating the location event information to the authentication computer.

22. The system of claim 20, wherein the electronic device comprises a radio frequency identification (RFID) tag associated with the package, and wherein the system further comprises an RFID reader configured and arranged to read the location event information from a memory of the RFID tag, and to communicate the location event information to the authentication computer.

23. The system of claim 21, wherein the authentication appliance is configured and arranged to automatically receive the location event information after the package has reached the destination location.

24. The system of claim 20, wherein the authentication computer is remote from the electronic device.

25. A method of evaluating the pedigree and/or integrity of a package transported from a source location to a destination location, the method comprising steps of:

(a) receiving information from an electronic device associated with the package at an authentication appliance at the destination location;

(b) transmitting at least a first portion of the information from the authentication appliance to a server;

(c) receiving from the server a network address of an authentication computer to be used to evaluate the pedigree and/or integrity of the package;

(d) after receiving the network address from the server, transmitting at least a second portion of the information from the authentication appliance to the authentication computer at the network address; and (e) receiving from the authentication computer a signal indicative of a determination made by the authentication computer concerning the pedigree and/or integrity of the package based upon a comparison of the at least the second portion of the information with data stored in a database.

26. The method of claim 25, wherein the electronic device comprises a radio frequency identification (RFID) tag.

27. The method of claim 25, wherein at least some of the second portion of the information comprises an electronic product code.

28. The method of claim 25, wherein at least some of the second portion of the information comprises location event information.

29. The method of claim 25, wherein at least some of the second portion of the information is indicative of at least one environmental condition to which the package has been exposed.

30. A method of evaluating the pedigree and/or integrity of a package transported from a source location to a destination location, the method comprising steps of:
  (a) receiving information from an electronic device associated with the package at an authentication appliance at the destination location;
  (b) transmitting at least a first portion of the information from the authentication appliance to a server;
  (c) receiving from the server a network address of an authentication computer to be used to evaluate the pedigree and/or integrity of the package;
  (d) after receiving the network address from the server, transmitting at least a second portion of the information from the authentication appliance to the authentication computer at the network address; and
  (e) with the authentication computer, comparing the at least the second portion of the information with data stored in a database to make a determination concerning the pedigree and/or integrity of the package.

31. The method of claim 30, wherein the electronic device comprises a radio frequency identification (RFID) tag.

32. The method of claim 30, wherein at least some of the second portion of the information comprises an electronic product code.

33. The method of claim 30, wherein at least some of the second portion of the information comprises location event information.

34. The method of claim 30, wherein at least some of the second portion of the information is indicative of at least one environmental condition to which the package has been exposed.

35. A method for evaluating the pedigree and/or the integrity of a package, comprising steps of:
  (a) receiving first information concerning the package at at least one processor, the first information reflecting a containment relationship amongst components of the package and having been accumulated at least in part before the package left a source location;
  (b) receiving second information concerning the package at the at least one processor, the second information reflecting a containment relationship amongst components of the package and having been having been accumulated after the package reached a destination location; and
  (c) using the at least one processor to compare the second information with the first information to evaluate the pedigree and/or confirm the integrity of the package.

36. The method of claim 35, further comprising a step of accumulating the second information by using a radio frequency identification (RFID) reader to read a plurality of RFID tags associated with the package.

37. The method of claim 35, further comprising a step of:
  communicating at least a portion of the first information from a warehouse management system at the source location to a database accessible by the at least one processor.

38. The method of claim 37, further comprising a step of:
  storing in the database, as at least a portion of the first information, repackaging information received from a repackaging location between the source location and the destination location, the repackaging information reflecting a change to the containment relationship amongst the components of the package that was effected at the repackaging location.

* * * * *